Figure 1:
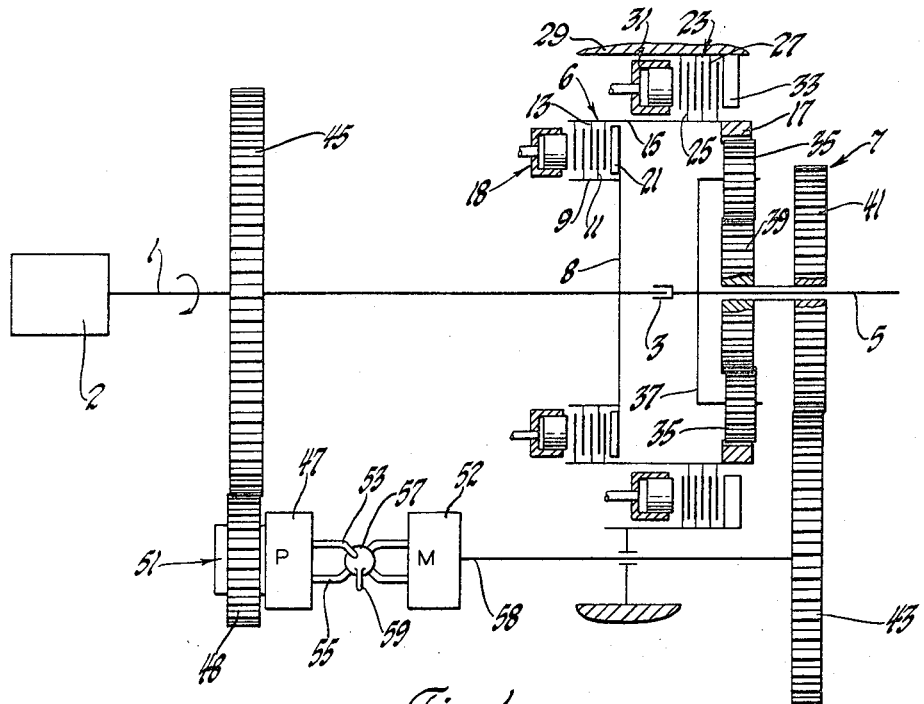

May 21, 1968  H. W. CHRISTENSON  3,383,952
HYDROSTATIC-MECHANICAL VEHICLE DRIVE
Filed Feb. 1, 1965

INVENTOR.
Howard W. Christenson
BY
*a. M. Heiter*
ATTORNEY

United States Patent Office 3,383,952
Patented May 21, 1968

3,383,952
HYDROSTATIC-MECHANICAL
VEHICLE DRIVE
Howard W. Christenson, Indianapolis, Ind., assignor to General Motors Corporation, Detroit, Mich., a corporation of Delaware
Filed Feb. 1, 1965, Ser. No. 429,599
3 Claims. (Cl. 74—720.5)

This invention relates to power transmissions and more particularly to vehicle transmissions providing full hydrostatic drives for low speed forward or reverse operation and providing higher drive ranges including split torque drives.

Power train istallations frequently employ prime movers designed to operate efficiently within a substantially constant speed range. It is advantageous that the power path between the prime mover and load be operable to accelerate the load without substantial decrease in engine speed. Conventional transmissions for engines having broad speed operating ranges generally are not compatible with such prime movers and transmissions especially designed for such prime movers are relatively complex, generally requiring the utilization of involved gearing and cooperating braking and clutching structures.

The transmissions of this invention utilize hydrostatic pump and motor units in a power path to range gearing which can be conditioned for low range operation in situations where torque multiplication is desired. Furthermore, a purely mechanical power path is provided into this range gearing for mechanical drives. In certain operating conditions split torque drives are obtainable in the maximum high drives with most of the power being through the mechanical path for maximum efficiency. When shifting from a lower range drive to higher range drive, ratio control is provided so that the highest speed available in the lower range drive will be approximately that of the lowest speed in the next higher range drive to permit maintenance of prime mover speed. When applied as a cross-drive, such as in tracked vehicles, this invention permits hydrostatic steer and allows controlled radius turns at any speed and pivot turns in the low speeds.

An object of this invention is to provide a new and improved transmission featuring hydrostatic drives and split torque drives.

Another object of this invention is to provide a new and improved transmission having a first torque path including hydrostatic pump and motor units coupled with range gearing conditionable for low range and reverse operation.

Another object of this invention is to provide a new and improved transmission having a first torque path through hydrostatic units and a separate torque path entirely through mechanical structure which can be combined by range gearing for split torque drive.

Another object of this invention is to provide a new and improved transmission having a first power path through mechanical structure into range gearing for driving an output member; a second power path from the range gearing through coupled hydrostatic pump and motor units back to the first power path adding torque into the first power path, and means for reversing the power flow through the second power path to drive the range gearing in conjunction with the first power path for split torque high range drives.

Another object of this invention is to provide a transmission in which the speed ratios are infinitely variable within finite limits which can be controlled so that the speed ratio at the beginning of an intermediate or high drive is substantially the same as the speed ratio of the immediately lower drive ratio.

A further object of this invention is to provide a cross drive transmission for providing controlled radius turns at any vehicle speed as well as a pivot turns at lower speeds.

A further object of this invention is provide a torque combining and variable ratio gear unit having plural input power paths and an output power path and with one of the input power paths including hydrostatic units providing infinitely variable speed ratios.

Figure 2:
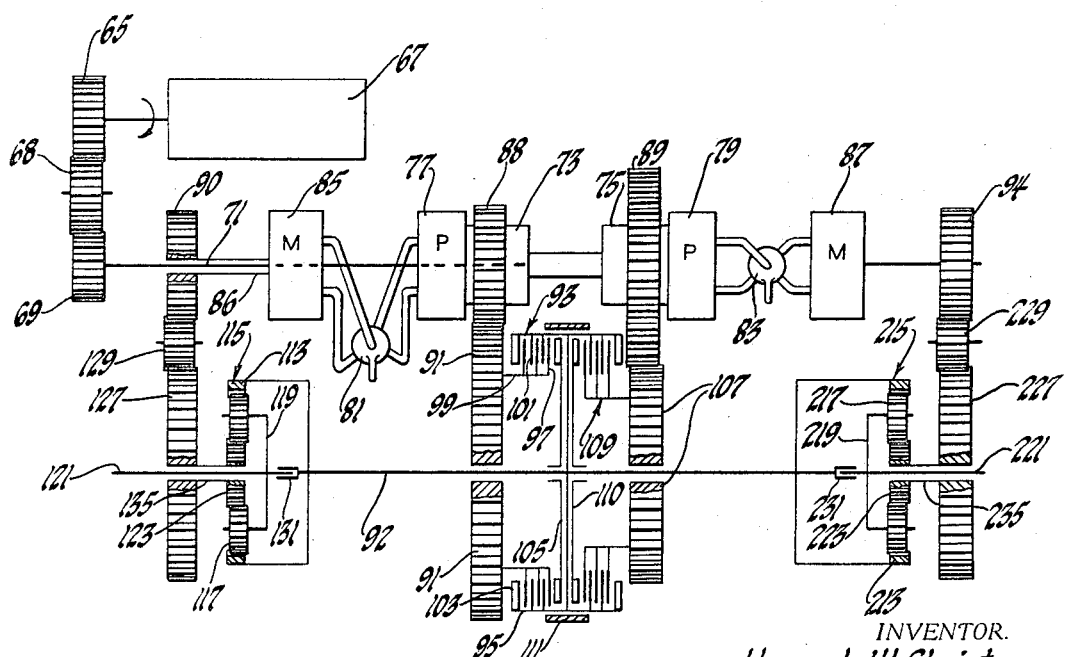

Other objects, advantages and uses of this invention will become apparent from the following detailed description taken in conjunction with the accompanying drawings wherein:

FIGURE 1 is a diagrammatic view disclosing a first embodiment of the invention, and FIGURE 2 is a diagrammatic view disclosing a second embodiment of the invention.

The transmission of FIGURE 1 is useful particularly in heavy vehicles such as trucks and includes an elongated input shaft 1 driven by prime mover 2, which is rotatably journalled at 3 in an output shaft 5. The input shaft can be connected to the output shaft through application of drive clutch 6 and range gearing 7, and will appear below. As illustrated, support plate 8 is secured near one end of shaft 1 for rotation therewith and has a cylindrical extension 9 which projects from one side thereof. This extension forms a support for clutch plates 11 splined thereon. Sandwiched between these clutch plates are additional clutch plates 13 splined to an internal portion of cylindrical extension 15 of ring gear 17 which forms part of the range gearing 7. This clutch plates, when displaced longitudinally by a hydraulically actuated motor 18 and compressed against backing surface 21 formed on the support plate 8, connect shaft 1 with the ring gear 17. A brake 23 has plates 25 splined to an external portion of the ring gear extension 15 and cooperating clutch plates 27 positioned between plates 25 splined to case 29. This brake is operated by a hydraulically actuated motor 31 which compresses the friction plates against the backing plate 33 for braking ring gear 17.

Return springs (not shown) can be utilized to move motors 18 and 31 back into the FIGURE 1 position when not actuated. The range gearing is preferably in the form of a planetary gear set and includes, in addition to the ring gear, planetary gears 35 which mesh with ring gear 17, planet carrier 37 on which the planets 35 are rotatably mounted and which is integral with the output shaft 5, and sun gear 39 rotatably mounted on the output shaft 5. The sun gear 39 includes an elongated sleeve portion supporting a laterally-spaced spur gear 41. This spur gear meshes with a second spur gear 43 which is adapted to be driven by hydrostatic units described below.

As shown in FIG. 1, the input shaft 1 has a spur gear 45 for driving a variable displacement hydraulic pump 47. This spur gear meshes with a gear 48 provided on the periphery of a rotatable displacement control mechanism or crank assembly 51 providing a pump input. This control mechanism includes means for varying and controlling pump displacement and may be similar to that disclosed in copending application Ser. No. 279,372 filed May 10, 1963, now Patent No. 3,273,344. The pump is hydraulically connected to a fixed displacement hydraulic motor 52 which may be of similar construction to the pump but without displacement controls, through delivery line 53 and return line 55. A suitable reversing valve 57 interconnects these lines to provide means for reversing the output of the motor. The motor and pump will rotate in the same direction until the reversing valve is applied by operation of handle 59 to reverse direction or rotation of motor output. The hydraulic motor and reversing valve can be of any suitable design and may, for example, be in accordance with corresponding components shown in the above-identified application.

It is contemplated that the motor, if desired, can be of a variable displacement type and have a displacement control similar to that of the pump. However, with the hydrostatic units described, output speed of the motor from zero to intermediate speed is obtained with constant power output by increasing the displacement of the pump. If motor displacement controls are utilized output speeds above this intermediate range with a decrease in torque are obtained by decreasing the displacement of the motor.

OPERATION—FIGURE 1

For low range operation, brake 23 is applied to hold ring gear 17 for reaction. The input shaft 1 will drive pump 47 through gearing 45 and 48 and fluid under pressure will be supplied to motor 52. The motor then rotates shaft 58 to turn spur gear 43 counterclockwise and returns fluid back to the pump through return line 55. Spur gear 43 driven by motor 52 drives spur gear 41 and the connected sun gear 39 forwardly or clockwise. Planetary gears 35 which mesh with sun gear 39 are then rotated counterclockwise. Since ring gear 17 is held, the planetary gears will walk in the ring gear 17 in a clockwise direction, thereby rotating carrier 37 and output shaft 5. By this means input torque is increased with corresponding reduction of the output speed of shaft 5. Since clutch 6 is not engaged, input shaft 1 is not mechanically connected to the planetary gear set and low range drive is all hydrostatic. Infinitely variable low range speed ratios are obtained by varying the displacement of the pump. The highest low range speed ratio is obtained with control 51 set for maximum pump displacement.

Reverse is obtained by simply reversing direction of motor rotation from counterclockwise to clockwise movement by rotating the reversing valve 57 to reverse direction of motor rotation. Motor reversal reverses the rotation of spur gears 43 and 41, sun gear 39 and the planet gears 35. Brake 23 is engaged and the ring gear is held for reaction as in low range operation. Counterclockwise or reverse rotation of the output shaft 5 is obtained as the planets walk in a counterclockwise direction in the reaction ring gear.

In the change from forward low ratio in the hydrostatic drive to intermediate split torque forward drive the following operation occurs: At the upper or high speed in the low range drive the motor 52 is rotating counterclockwise at its maximum speed. If it is desired at this point to enter into a higher drive range, clutch 6 is engaged to connect the output shaft 5 to the input shaft 1 through the planetary gear set 7 while the brake 23 is released.

To prevent the immediate combination of the forward drive of the sun gear 39 by the hydraulic pump and motor units and the ring gear 17 by direct mechanical input which would possibly stall out of the engine, it is desirable to produce an output speed at the beginning of this higher range drive which is equal to or only slightly greater than the highest output speed of the low drive range. This is accomplished by reversing the direction of flow between the pump and motor units by actuating the reversing valve 57. The immediate result of this reversal of the flow path between the pump and motor creates a braking effect between these hydrostatic units causing the motor to immediately slow down to zero and reverse direction of rotation. At the same time the engagement of the drive clutch 6 provides a drive to the ring gear 17. This drive must seek a reaction through the planet gear 35 which acts on the fulcrum provided by the output-held carrier 37 to induce a negative torque into the sun gear 39. This negative torque aids the transition of the motor output from counterclockwise to clockwise rotation. When the device reaches equilibrium, the motor is rotating clockwise at its maximum speed since the displacement control is set for maximum displacement.

Since the motor is providing the reaction for the drive of the ring gear the motor acts as a pump to motor the pump 47. The pump 47 acting as a motor then puts torque back into the input shaft 1. Under these conditions the pump is at full displacement and the pump and motor act as a 1:1 coupling to provide a regenerative-type split torque drive to the output. To increase the speed in this range the displacement of the pump may be reduced. This places a greater restriction in the hydrostatic regeneration path and slows down the motor. This action proceeds until the displacement of the pump is zero. With zero pump displacement, the motor holds the sun gear 39 of the planetary gear set 7 stationary and the drive is 100% mechanical. In this condition planetary gearset torque multiplication is reduced and output speed is increased.

In order to increase the output speed beyond this point the reversing valve between the pump and the motor is restored to its original drive position. This does not change the instant drive situation since the motor is stationary at this time and the pump displacement is zero. To increase the output speed the displacement of the pump is merely increased by operation of control 51 to provide for the forward drive of the sun gear 39 by the motor. This procedure is carried out until the displacement of the pump reaches its maximum value providing the maximum output speed. In this condition the drive is split torque.

In the cross-drive transmission of FIGURE 2, useful particularly in tracked vehicles, an input spur gear 65 is powered by a suitable prime mover such as free piston or gas turbine engine 67. The input gear through gear 68 drives spur gear 69 and elongated drive shaft 71 secured thereto forwardly. Shaft 71 simultaneously drives control mechanisms, or crank assemblies 73 and 75, for the variable displacement pumps 77 and 79. These control mechanisms are similar to the control mechanism of the FIGURE 1 embodiment and accordingly those of patent application S.N. 279,372, filed May 10, 1963, each including means for varying and controlling the displacement of the pumps. The above referenced application in particular discloses control means for pump displacement drive and steer control which can be readily adopted for use in this transmission.

Reversing valves 81 and 83, each similar to that of the FIG. 1 embodiment, are disposed between delivery and return lines connecting the pumps 77, 79 to fixed displacement hydrostatic motors 85, 87, as illustrated, for reversing the output of the motors under circumstances which will appear below. The control mechanism 73 for the pump 77 has an intermediate drive spur gear 88 secured thereto and the control mechanism of the second pump has a high drive spur gear 89 secured thereto having a pitch diameter greater than the pitch diameter of that of the gear 88. These spur gears are rotatable with the control housing and are used for intermediate and high range drives, as will be hereinafter described.

Motor 85 has an elongated tubular output shaft portion 86 and carries a spur gear 90 at its end; motor 87 drives a spur gear 94 which has a pitch diameter equal to the pitch diameter of spur gear 90. Spur gear 88 meshes with intermediate drive spur gear 91 which is rotatably mounted on elongated drive shaft 92. A clutch 93 is adapted, when engaged, to connect spur gear 91 to a housing 95 rigidly supported on shaft 92. Clutch 93 includes plates 97 splined to a cylindrical extension 99, provided on spur gear 91 and cooperating plates 101 splined to the internal portion of the housing 95. This housing also carries a fixed backing plate 103 for the clutch plates. A motor 105 is adapted to compress the clutch plates against the backing plate to join the spur gear 91 with the drive shaft 92. For high range drives the gear ratio of spur gear 107 and meshing gear 89 provides an output speed which is greater than that of intermediate drive gears 88 and 91. As illustrated, gear 107 may be connected to shaft 92 by application of clutch 109 through motor 110. Clutch 109 and motor 110 are similar in construction to clutch 93 and motor 105. A low and reverse brake band 111 can be applied to the outer periphery of housing 95 to hold the ring gears 113 and 213 of right and left planetary gear sets 115 and 215 for reaction, as will be hereinafter described.

The left and right planetary gear sets are substantially the same and have gear set elements corresponding in pitch diameters. Accordingly, only planetary gear set 115 will be described in detail. This planetary gear set includes planetary gears 117 which mesh with ring gear 113, an output carrier 119 on which the planets are rotatably mounted and which is secured to an output shaft 121, and sun gear 123 which is rotatably journalled on the output shaft 121 and which carries spur gear 127. Idler 129 meshes with spur gears 90 and 127 so that operation of motor 85 will rotate sun gear 123. The right planetary gear set 215 includes planet gears 217 meshing with ring gear 213 and sun gear 223. Motor 87 is mechanically connected to sun gear 223 by spur gears 91, idler 229, spur gear 227 and sleeve 235. Planet carrier 219 is secured to the right output shaft 221. As shown, shafts 221 and 121 are respectively journalled at 131 and 231 in opposite ends of shaft 92.

OPERATION—FIGURE 2

At low range operation in which increase of input torque is desired for initially moving the vehicle, brake band 111 is applied to the outer periphery of housing 95. This results in the holding of ring gears 113 and 213 for reaction. In this condition of operation the prime mover 67 will operate pumps 77 and 79, which, in turn, drive motors 85 and 87, respectively. Motor 85 will drive spur gear 90 which, in turn, drives idler 129, spur gear 127 and connected sun gear 123. Torque is multiplied as planets 117 walk in a forward direction in reaction ring gear 113. This drives carrier 119 and output shaft 121 increasing the torque and producing low range output speed. The right planetary gear set will be operated in a similar manner by motor 87. Since the planetary gear sets 115 and 215 have the same dimensions, output speed will be the same when pump displacement is the same. Output speed can be increased by increasing the displacement of the pumps. Since input is coming only from hydrostatic motors 85 and 87 the low range drive will be hydrostatic.

Reverse is obtained by reversing the valves 81 and 83 from their forward drive settings to a reverse drive setting to reverse the direction of fluid input into the motors. This reverses the direction of output of the motors and accordingly the rotation of sun gears 123 and 223. Output shafts 121 and 221 are driven in a reverse direction as the planet gears driven by these sun gears walk in the reaction sun gears 113 and 213, and carriers 119, 219 and the output shafts 121 and 221 will be driven in a reverse direction.

At the upper or highest speed in low range drive the motors 85 and 87 are rotating forwardly at their maximum speed and driving the planetary input sun gears accordingly. If it is desired to shift into a higher speed or intermediate speed ratio, drive clutch 93 is engaged, brake 111 is released and the valves 81 and 83 are conditioned to reverse direction of motor output to prevent engine stall as described in connection with the first embodiment. This valve reversal reverses the flow path between the pumps and motors and creates a braking effect between these hydrostatic units causing the motors to immediately slow down to zero and reverse their direction of rotation, at the same time the engagement of the drive clutch 93 provides mechanical drive through the spur gears 88 and 91 to ring gears 113 and 213. This drive finds reaction through the planet gears 117 and 217 which act on the fulcrums provided by the output held carriers 119 and 219 to induce a reverse torque into sun gears 123 and 223 which aids the transition of motor rotation from forward to reverse.

When the hydrostatic units reach equilibrium the motors are operating at full speed in reverse since these motors are providing the reaction for the drive of the ring gears. Motors 85 and 87 act as fixed displacement pumps to motor the pumps 77 and 79 to put torque back into the drive shaft 92.

Under the above conditions the pumps are at full displacement and the pumps and motors act as a 1:1 coupling to provide a regenerative-type split torque drive to the output.

To increase the speed in this intermediate range the displacement of the pumps are reduced through controls 73 and 75. This places a greater restriction in the hydrostatic regenerative path and slows down the motors. This action proceeds until the displacement of the pump is zero. At this instant the sun gears 123 and 223 of the planetary gear sets are held stationary and the drive is all mechanical. In order to increase the output speed beyond this point the reversing valves 81 and 83 are restored to their original or forward drive position. This does not change the instant drive situation since the motors are stationary and pump displacement is held at zero. To increase the output speed, the displacement of the pumps 77 and 79 are increased by operation of controls 73 and 75 to provide a forward drive from the pump to the sun gears 123 and 223. This procedure is carried out until the displacement of the pumps reaches their maximum value providing the maximum output speed and the drive is split torque.

In a similar manner a still higher drive may be obtained by application of clutch 109 for drive through spur gears 89 and 107 and initially changing the valves 81 and 83 to their reverse drive positions.

It will be appreciated that with the transmissions of this invention vehicle operation is improved by the provision of infinitely variable ratios, in hydrostatic low range and split torque higher range drives. Additionally, in the cross drive transmission controlled steer for tracked vehicles from pivot turn to infinite radius turn can be obtained by controlling pump displacement and driving the left and right outputs at different and controlled speeds. The embodiments may be modified in any suitable manner to achieve the objectives of this invention. Thus, in the cross drive transmission of FIG. 2, the prime mover 67 may have an output which is directly geared to either spur gear 88 or 89 of controls 73 and 75 to drive the pumps 77 and 79 to eliminate gears 65 and 69 and the idler, as well as shaft 71. Furthermore, the motors 85 and 87 may, like the pump, be of the variable displacement type and provided with suitable displacement controls which can be utilized to increase output speed by reducing motor displacement.

It will be further understood that other changes and modifications may be made to the above-described embodiments of the transmissions without departing from the spirit of the invention and the scope of the claims which follow.

I claim:

1. In a transmission having an input and a pair of outputs, a pair of fluid pumps, first drive means connecting said input to each said pumps, a pair of fluid motors, means hydraulically connecting a first of said pumps to a first of said motors and hydraulically connecting a second of said pump to a second of said motors, each of said motors having a rotatable output, first and second planetary gearsets associated with said first and second outputs respectively, each of said gearsets including a sun gear member and a ring gear member connected by pinions and including a carrier member for said pinions, one of said members of each gearset providing a first input member and another of said members providing a second input member and a third of said members providing an output member, drive means connecting the output member of each gearset and an associated transmission output, torque transmitting means operatively connected to said first drive means, a selectively engageable clutch having first friction means operatively connetced to said torque transmitting means and having second friction means operatively connected to said second input of each of said gearsets, a selectively engageable friction drive establishing device operatively connected to both of said second input members of said gearsets when engaged to hold said second input members from rotation when only said first inputs of said gearsets are driven and to thereby condition said transmission for an all hydrostatic low drive range, displacement control means operatively connected to each said pump and movable from zero displacement to a high displacement to vary the displacement of each said pump to vary the speed of said motor and the hydrostatic low drive range between low and high speed ratio, reversing valve means hydraulically connected to each said pump and motor movable to reverse the direction of output of each of said motors as said friction means of said clutch are engaged and said friction drive establishing device is released to condition said transmission for split hydraulic and mechanical torque higher range drive and at an initial low speed ratio substantially the same as the high speed ratio in said hydrostatic low range drive, and each said displacement control means being subsequently movable toward zero displacement to reduce the speed of said outputs of motors until at zero displacement said motors hydraulically arrest the rotation of said first input member of each gearset to condition said transmission for an all-mechanical drive with an input to output ratio different from the high ratio in the hydrostatic drive range.

2. In a cross drive transmission, an input member, first and second output members, spaced first and second planetary gear sets each having an input ring gear and a sun gear, each of said gear sets having planet gears meshing with said input gears and a carrier for planetary gears providing an output means, first gear means driven by said input member for driving said input ring gears, second gear means having a speed ratio larger than that of the first gear means driven by said input member, first clutch means selectively engageable to enable said first gear means to simultaneously drive said ring gears, second clutch means selectively engageable simultaneous with the disengagement of said first clutch means to allow said second gear means to simultaneously drive said ring gears, first and second hydrostatic pumps, drive means connecting said pumps to said input member, means for varying and controlling the displacement of each of said pumps, a hydrostatic motor for each of said pumps, delivery and return hydraulic lines connecting each of said motors and pumps, a reversing valve disposed in said lines between each of said pumps and motors, each said reversing valve in one selected position allowing each said pump to drive each said motor in a first direction and in a second selected position allowing each said pump to drive each said motor in a second direction, each of said motors having an output, means connecting each of said outputs to a sun gear, selectively engageable means for holding said ring gears to condition said gear sets for low range fully hydrostatic drives, said valve when displaced to one of said positions conditioning said transmission for low range hydrostatic reverse drives.

3. In a cross drive transmission, an input member, first and second output members extending in opposite directions, first and second gear sets driven by said input member, each said gear set having a drive and a meshing driven gear, one of said gear sets having a gear ratio greater than the gear ratio of the other said gear set, first and second planetary gear sets each having an input ring gear and an input sun gear and an output carrier, first clutch means selectively engageable to connect said driven gear of said first gear set to said input ring gears, second clutch means selectively engageable to connect said driven gear of said second gear set to said input ring gears simultaneous with the disengagement of said first clutch means, first and second hydrostatic pumps driven by said input member, first and second hydrostatic motors driven respectively by said first and second pumps, means for varying and controlling the displacement of said pumps, valve means disposed between said first motor and said first pump and between said second motor and said second pump to control and reverse direction of motor rotation, each of said motors having an output shaft, means connecting the output shaft of one of said motors to the input sun gear of said first planetary gear set, and means connecting the output shaft of the other of said motors to the input sun gear of said second planetary gear set, said output carrier of said first planetary gear set being connected to said first output member, and said output carrier of said second planetary gear set being connected to said second output member, and selectively engageable means for holding said ring gears for reaction.

References Cited
UNITED STATES PATENTS

| | | | |
|---|---|---|---|
| 2,599,814 | 6/1952 | Cull | 74—687 |
| 2,874,591 | 2/1959 | Thoma | 74—687 |
| 2,901,922 | 9/1959 | Baker | 74—687 |
| 3,075,408 | 1/1963 | Chapman et al. | 74—720.5 |
| 3,095,757 | 7/1963 | Thoma | 74—687 |
| 3,122,025 | 2/1964 | Mark et al. | 74—687 |
| 3,199,376 | 8/1965 | Delalio | 74—720.5 |
| 3,250,151 | 5/1966 | Binger | 74—687 |
| 3,253,688 | 5/1966 | Livezey | 74—720.5 |
| 3,273,344 | 9/1966 | Christenson et al. | 60—53 |

FOREIGN PATENTS 236,982  1/1962  Australia.

DONLEY J. STOCKING, *Primary Examiner.*

DAVID J. WILLIAMOWSKY, *Examiner.*

T. C. PERRY, *Assistant Examiner.*